United States Patent
Ozuysal et al.

(10) Patent No.: US 10,812,564 B1
(45) Date of Patent: *Oct. 20, 2020

(54) PRELOADING CONTENT FOR REQUESTING APPLICATIONS

(71) Applicant: Google LLC, Mountain View, CA (US)

(72) Inventors: Yusuf Ozuysal, Mountain View, CA (US); Adam Connors, Northchurch (GB)

(73) Assignee: Google LLC, Mountain View, CA (US)

( * ) Notice: Subject to any disclaimer, the term of this patent is extended or adjusted under 35 U.S.C. 154(b) by 934 days.

This patent is subject to a terminal disclaimer.

(21) Appl. No.: 15/422,378

(22) Filed: Feb. 1, 2017

Related U.S. Application Data

(63) Continuation of application No. 13/963,996, filed on Aug. 9, 2013, now Pat. No. 9,565,233.

(51) Int. Cl.
*H04L 29/08* (2006.01)

(52) U.S. Cl.
CPC .......... *H04L 67/02* (2013.01); *H04L 67/2842* (2013.01); *H04L 67/306* (2013.01)

(58) Field of Classification Search
CPC ... H04L 67/2842; H04L 67/22; H04L 67/306; H04L 41/0823; H04L 43/08; H04L 67/02
See application file for complete search history.

(56) References Cited

U.S. PATENT DOCUMENTS

| | | | |
|---|---|---|---|
| 5,802,292 A | 9/1998 | Mogul | |
| 6,067,565 A | 5/2000 | Horvitz | |
| 6,085,226 A | 7/2000 | Horvitz | |
| 6,282,542 B1 | 8/2001 | Carneal et al. | |
| 6,385,641 B1 | 5/2002 | Jiang et al. | |
| 6,769,015 B1 | 7/2004 | Bates et al. | |
| 6,807,570 B1 | 10/2004 | Allen et al. | |
| 7,194,514 B1 | 3/2007 | Yen et al. | |
| 7,467,137 B1 | 12/2008 | Wolfe | |
| 7,747,749 B1 | 6/2010 | Erikson et al. | |
| 7,895,261 B2 | 2/2011 | Jones et al. | |
| 7,975,025 B1 | 7/2011 | Szabo et al. | |
| 8,051,249 B2 | 11/2011 | Mosek et al. | |
| 8,250,156 B2 | 8/2012 | Baek et al. | |
| 8,291,503 B2 | 10/2012 | Hamid | |
| 8,332,500 B1 | 12/2012 | Singleton et al. | |
| 8,386,573 B2 | 2/2013 | O'Sullivan et al. | |
| 8,560,964 B2 | 10/2013 | Dodson et al. | |

(Continued)

OTHER PUBLICATIONS

Prosecution History from U.S. Appl. No. 13/963,996 dated Sep. 24, 2013 through Jan. 12, 2017, 196 pp.

*Primary Examiner* — Maryam M Ipakchi
(74) *Attorney, Agent, or Firm* — Shumaker & Sieffert, P.A.

(57) ABSTRACT

Methods for preloading content in one application for another application are provided. A request by an online content viewing application is received from a requesting application to preload content in the online content viewing application, and the content is loaded in the online content viewing application in response to the request. A display of the requesting application is switched to a display of the online content viewing application, and the loaded content is provided for display in the online content viewing application, in response to a user selection in the requesting application to display the content. Systems and machine-readable media are also provided.

20 Claims, 6 Drawing Sheets

(56) References Cited

U.S. PATENT DOCUMENTS

| | | |
|---|---|---|
| 8,655,819 B1 | 2/2014 | Burkard et al. |
| 8,943,149 B2 | 1/2015 | Lyle et al. |
| 9,565,233 B1 | 2/2017 | Ozuysal et al. |
| 2002/0023145 A1 | 2/2002 | Orr et al. |
| 2002/0078165 A1 | 6/2002 | Genty et al. |
| 2002/0188685 A1 | 12/2002 | Bhogal et al. |
| 2003/0088580 A1 | 5/2003 | Desai et al. |
| 2003/0090510 A1 | 5/2003 | Shuping et al. |
| 2005/0138143 A1 | 6/2005 | Thompson |
| 2006/0070012 A1 | 3/2006 | Milener et al. |
| 2006/0259567 A1* | 11/2006 | Jennings ............... G06Q 10/107 709/207 |
| 2006/0277271 A1 | 12/2006 | Morse |
| 2007/0216674 A1 | 9/2007 | Subramanian |
| 2008/0201332 A1 | 8/2008 | Souders |
| 2008/0301300 A1 | 12/2008 | Toub |
| 2009/0019153 A1 | 1/2009 | Sebastian |
| 2009/0043865 A1 | 2/2009 | Dumitru et al. |
| 2009/0094196 A1 | 4/2009 | Piwowarski et al. |
| 2009/0164992 A1 | 6/2009 | Flake et al. |
| 2010/0017600 A1 | 1/2010 | Lepeska et al. |
| 2010/0066676 A1 | 3/2010 | Kramer et al. |
| 2010/0115388 A1* | 5/2010 | Nguyen ............... G06F 16/9574 715/205 |
| 2010/0174735 A1 | 7/2010 | Fiatal |
| 2010/0281224 A1 | 11/2010 | Ho et al. |
| 2010/0281423 A1* | 11/2010 | Kano ................... G06F 3/0481 715/794 |
| 2011/0040718 A1 | 2/2011 | Tendjoukian et al. |
| 2011/0173569 A1* | 7/2011 | Howes ................ G06F 16/9574 715/835 |
| 2012/0023226 A1* | 1/2012 | Petersen ................ H04W 4/18 709/224 |
| 2012/0047445 A1 | 2/2012 | Rajagopal |
| 2012/0246257 A1 | 9/2012 | Brown |
| 2012/0317187 A1 | 12/2012 | Fredricksen et al. |
| 2013/0019159 A1 | 1/2013 | Civelli et al. |
| 2013/0120294 A1 | 5/2013 | Sun et al. |
| 2013/0198261 A1* | 8/2013 | Matas ..................... G06F 8/34 709/203 |
| 2014/0053057 A1 | 2/2014 | Reshadi et al. |
| 2015/0200994 A1 | 7/2015 | Jain et al. |

\* cited by examiner

US 10,812,564 B1

PRELOADING CONTENT FOR REQUESTING APPLICATIONS

CROSS-REFERENCE TO RELATED APPLICATION

The present application claims the benefit of priority under 35 U.S.C. § 120 as a continuation of U.S. patent application Ser. No. 13/963,996 entitled "Preloading Content For Requesting Applications," filed on Aug. 9, 2013, the disclosure of which is hereby incorporated by reference in its entirety for all purposes.

BACKGROUND

The present disclosure generally relates to the transmission of data over a network, and more particularly to the use of a computing device to display requested data communicated over a network.

Non-mobile computing devices such as desktop computer and laptop computers usually have faster computing speed and access to faster network connections than other types of computing devices. As a result, a user using an application such as a web browser on a non-mobile computing device (a "non-mobile application") is accustomed to faster content loading and rendering times.

On the other hand, mobile computing devices, such as smartphones, have slower computing speeds and slower network access connections (e.g., to mobile data telecommunication networks) than non-mobile computing devices. As a result, when a user selects content such as a web page in a non-web browser application to view in a web browser for a mobile device (a "mobile web browser"), the loading and display speed of both the mobile web browser and the web page in the mobile web browser is slowed by the computing capacity and limited bandwidth of the mobile device. A user that is accustomed to faster loading and display times for non-mobile web browsers can find the slower load and display time of the mobile web browser and web page on the mobile web browser to be frustrating.

SUMMARY

According to one embodiment of the present disclosure, a method for preloading content in one application for another application is provided. The method includes receiving a request by a first application from a requesting application to preload content in the first application, and loading the content in the first application in response to the request from the requesting application. The method also includes switching from a display of the requesting application to a display of the first application and providing the loaded content for display in the first application in response to a selection in the requesting application from a user to display the content.

According to another embodiment of the present disclosure, a system for preloading content in one application for another application is provided. The system includes a memory that includes instructions, and a processor. The processor is configured to execute the instructions to receive a request by a first application from a requesting application to preload content in the first application, and load the content in the first application in response to the request from the requesting application. The processor is also configured to execute the instructions to switch from a display of the requesting application to a display of the first application and provide the loaded content for display in the first application in response to a selection in the requesting application from a user to display the content. The content is rendered for display in the requesting application in response to the selection in the requesting application from the user to display the content.

According to a further embodiment of the present disclosure, a machine-readable storage medium that includes machine-readable instructions for causing a processor to execute a method for preloading content in one application for another application is provided. The method includes receiving a request by a web browser from another application to preload a web page in the web browser, and loading the web page in the web browser in response to the request from the other application. The method also includes switching from a display of the other application to a display of the web browser and providing the loaded web page for display in the web browser in response to a selection in the other application from a user to display the web page. The web page is rendered for display in the requesting application in response to the selection in the requesting application from the user to display the web page. The request by the first application from the requesting application to preload the web page in the first application is received while the requesting application is in the foreground, and the web page is loaded in the first application in the background while the requesting application remains in the foreground. When the first application is not running in the background, the first application is initialized in the background in response to the request being received by the first application from the requesting application to preload the web page in the first application.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides an interface to a first application, such as a web browser, which permits a second application to request that the first application preload content for display. Specifically, after the second application is executed on a device and the second application loads its own content for display, the second application may interact with the first application using an interface for the first application in order to request that the first application initialize, if necessary, and request that the first application after initialization preload content for display. The content that is preloaded for display can be identified by the second application in the request made to the first application, or the first application can itself identify the content for preloading based on other information provided by the second application, such as a user browsing history.

Although certain examples provided herein may describe a user's information (e.g., browsing history and user input) being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Figure 1:
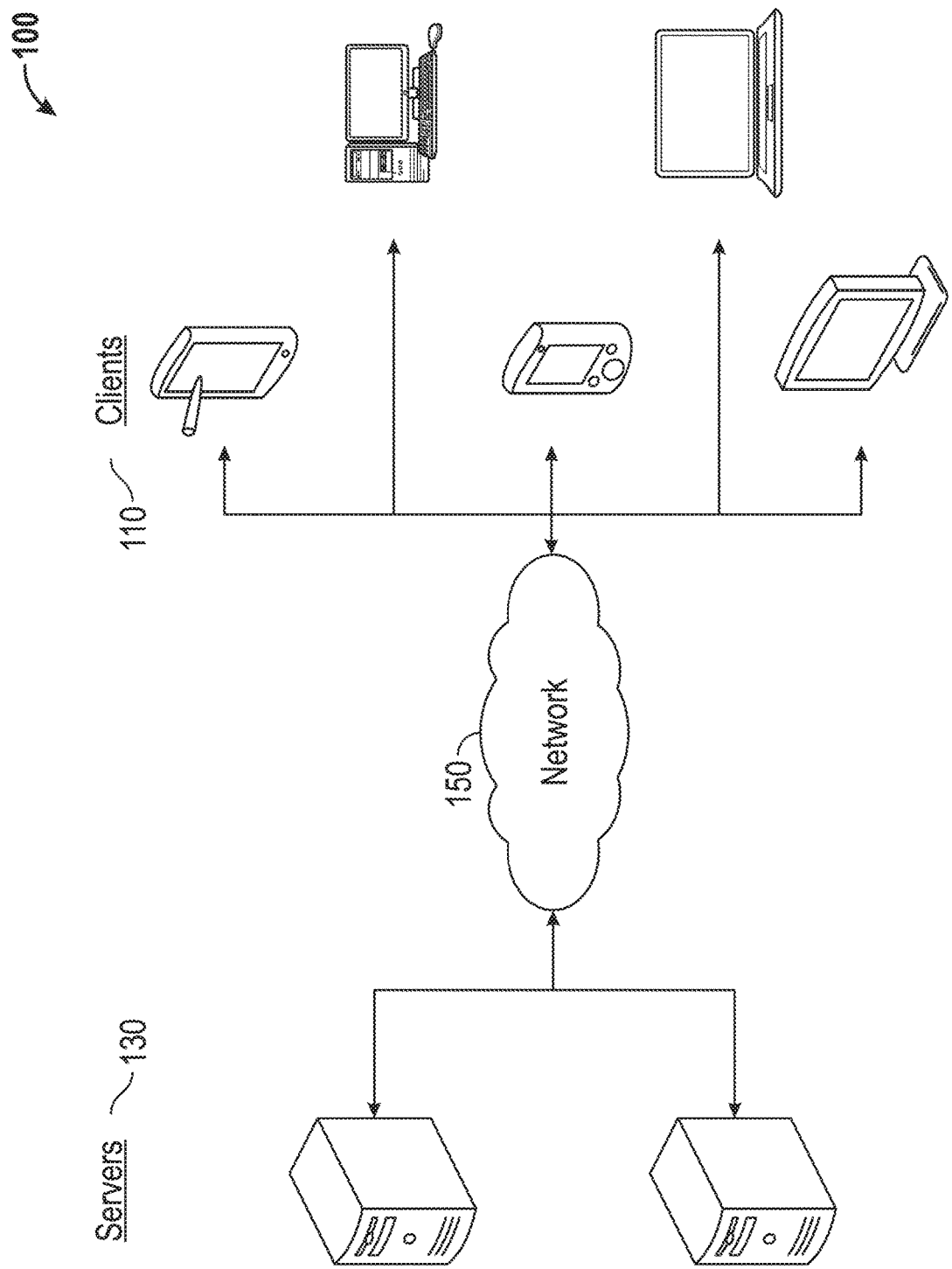
FIG. 1 illustrates an example architecture for pre loading content in one application for another application.

FIG. 1 illustrates an example architecture 100 for preloading content in one application for another application. The architecture 100 includes servers 130 and clients 110 connected over a network 150.

Each of the clients 110 is configured to run an application for preloading content ("content preloading application or "first application") as disclosed herein. In certain aspects, the clients 110 can download and install the content preloading application from one of the servers 130. The content preloading application is configured to run on clients 130 that are mobile or non-mobile. The clients 110 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. In certain aspects, certain advantages of the content preloading application, such as faster content loading time in response to a request, are most salient on clients 110 that are mobile devices or that otherwise have slower processing and network data download speeds.

If needed, the content preloading application can be downloaded over the network 150 from one of the many servers 130. For purposes of load balancing, multiple servers 130 can also host the data for downloading the content preloading application. In certain instances, different versions and/or configurations of the content preloading application that include the features disclosed herein are available for download from a server 130 and subsequent installation depending on whether the client 110 is a mobile device or non-mobile device. The content preloading application, once installed on a client 110, is configured to load content (e.g., web pages) from any one or multiple servers 130 hosting the content. The servers 130 can be any device having an appropriate processor, memory, and communications capability for hosting the data for installing the web browser and for hosting the web pages. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed content preloading application, once executed on a client 110, is configured to receive a request from another application (a "requesting application") to load content in the content preloading application while the content preloading application is in the background (e.g., as a background process) and the requesting application remains in the foreground (e.g., as a foreground process). In certain aspects, if the content preloading application is not running in the background, the content preloading application is initialized (or "warmed up") in the background prior to loading the content in the background. The content to be preloaded can be identified by the requesting application, or identified by the content preloading application in response to data from the requesting application. For example, if the requesting application indicates that a user is currently viewing search results for "pizza," the content preloading application can load a web page associated with the first search result for "pizza" in the background. Alternatively, the requesting application can provide the content preloading application with the web page address associated with the first search result for "pizza" for the content preloading application to load in the background. If the user then selects the link for the web page associated with the first search result for "pizza," the content preloading application will be displayed with the web page associated with the first search result substantially immediately due to the web page having been preloaded in the background prior to the user selection.

Figure 2:
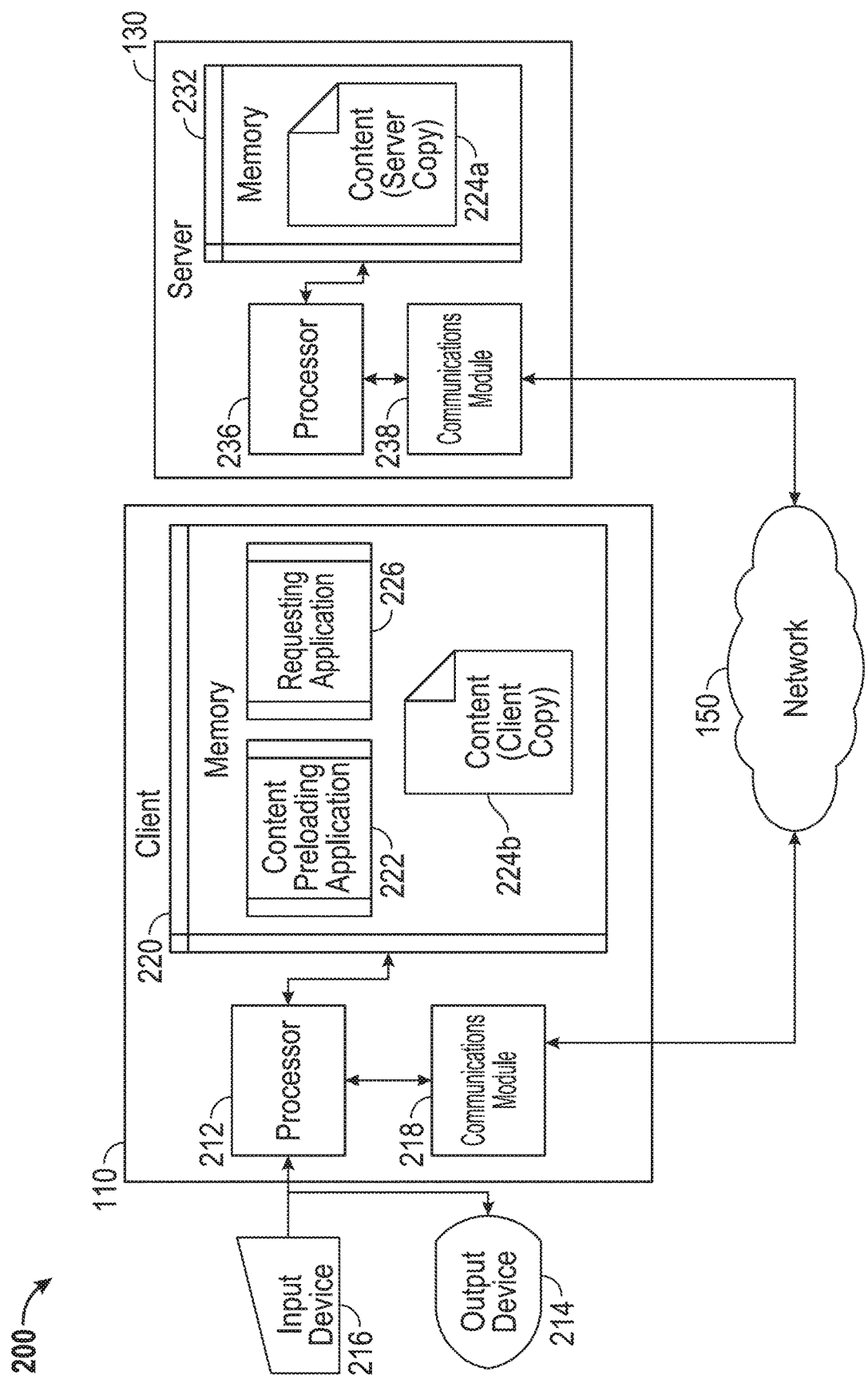
FIG. 2 is a block diagram illustrating the example client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that includes a content preloading application 222 (e.g., the "first application") a requesting application 226 (e.g., the "second application"), and a client 110 copy of content 224b to display in the content preloading application 222 using the output device 214 (e.g., a display) of the client 110. The content preloading application 222 can be, for example, a web browser, document viewer, image viewer, or other application configured to load and render content 224b for display. The requesting application 226 can be, for example, a search application, a reading application, communication application, or any other application that is not configured to display the content 224b. The client 110 also includes an input device 216, such as a keyboard, touchscreen, or mouse, to receive user input.

The processor 212 of the client 110 is configured to execute instructions, such as instructions physically coded into the processor 212, instructions received from software (e.g., the content preloading application 222) in memory 240, or a combination of both, to preloading content in the content preloading application 222 for the requesting application 226. For example, the processor 212 of the client 110 executes instructions from the content preloading application 222 to receive (e.g., by the content preloading application 222) a request from the requesting application 226 to preload content 224a in the content preloading application 222. As illustrated, the content is to be downloaded from a server copy of the content 224a over the network 150 from the server 130 and stored in the memory 220 of the client 110 as a client copy of the content 224b. In other aspects, the content 224b to be preloaded may already reside in the memory 220 of the client 110.

The request by the content preloading application 222 from the requesting application 226 to preload content 224a in the content preloading application 222 can be received, for example, while the requesting application 226 is in the foreground. The request can be received using an application programming interface for requesting content be preloaded provided by the content preloading application 222. For example, the requesting application 226 can be a foreground process, namely, a process that is required for what a user is currently doing. The content 224a may then be loaded in the content preloading application 222 in the background while the requesting application 226 remains in the foreground. For example, the content preloading application 222 can be, running as a background process, namely, a process holding an activity that is not currently visible to the user. The request to the application programming interface of the content preloading application 222 may indicate that the content 224a be downloaded by the content preloading application 222 from the server 130 over the network, and the content 224b may then be stored in the memory 220 of the client 110 for loading by the content preloading application 222. When the content preloading application 222 is not running in the background (e.g., as a background process), or is otherwise not in a state to load the content 224a, the content preloading application 222 is initialized in the background in response to the request being received by the content preloading application 222 from the requesting application 226 to preload content in the content preloading application 222.

The processor 212 is also configured to load the content 224a in the content preloading application 222 in response to the request from the requesting application 226, and in response to a selection in the requesting application 226 from a user to display the content 224a, switch from a display of the requesting application 226 (e.g., as a foreground process) to a display of the content preloading application 222 (e.g., switching from a background process to a foreground process) and provide the loaded content for display in the content preloading application 222. In certain aspects, the content is rendered for display in the requesting application 226 in response to the selection in the requesting application 226 from the user to display the content.

Additionally, in certain aspects, the processor 212 is configured to receive another request from the requesting application 226 indicating the content 224b is not needed, and unload the content in the content preloading application 222 in response to the other request. For example, if the requesting application 226 initially requests the content preloading application to load the content 224b in the background, but the requesting application 226 later determines that the content 224b will no longer be needed (e.g., due to a user browsing to a different web page than predicted), then the requesting application 226 can inform the content preloading application 222 that the content 224b is no longer needed and the content preloading application 222 can unload or otherwise discard the content 224b (e.g., stored as local copy of content 224a) from memory 220.

The requesting application 226 can either identify the content 224a to be preloaded by the content preloading application 222, or can provide information to the content preloading application 222 as part of the request so that the content preloading application 222 can evaluate the information from the requesting application 226 to recommend or otherwise determine the content 224a to load. For instance, where the content preloading application 222 is a web browser, the 224a content to be preloaded in the content preloading application 222 can be a webpage. In such instances, when the requesting application 226 is configured to identify the content 224a to be preloaded by the content preloading application, the request from the requesting application 226 to preload content can include an address of the webpage to be loaded by the content preloading application 222 in the background.

In other instances where the requesting application 226 is configured to provide information to the content preloading application 222 as part of the request so that the content preloading application 222 can evaluate the information from the requesting application 226 to recommend or otherwise determine the content 224a to load, the request from the requesting application 226 to preload content can include a browsing history of the user. The content preloading application 222 can then identify the content 224a to preload in the content preloading application 222 based on the browsing history of the user. For example, if the requesting application 226 indicates to the content preloading application 222 that a user of the requesting application 226 is currently browsing a web page listing local restaurants, and that the user has previously conducted a search for local pizza restaurants, the content preloading application 222 can load a link to a most prominently listed local pizza restaurant listed on the web page.

In other instances where the requesting application. 226 is configured to provide information to the content preloading application 222 as part of the request so that the content preloading application 222 can evaluate the information from the requesting application 226 to recommend or otherwise determine the content 224a to load, the content preloading application 222 may identify the content to preload in the content preloading application 222 based on a probability value that the content to preload will be selected by the user in the requesting application 226. Using the previous example, if the requesting application 226 indicates to the content preloading application 222 that a user of the requesting application 226 is currently browsing a web page listing local restaurants, the content preloading application 222 can load a link to two of the most prominently listed local pizza restaurants listed on the web page because the two restaurants meet a threshold probability that they would be most likely selected by the user in the requesting application 226. As such, the content to be preloaded in the content preloading application 222 is not limited to one item of content, but can be multiple items of content such as multiple webpages.

In further instances where the requesting application 226 is configured to provide information to the content preloading application 222 as part of the request so that the content preloading application 222 can evaluate the information from the requesting application 226 to recommend or otherwise determine the content 224a to load, the request from the requesting application 226 to preload content can include input currently entered by the user in the requesting application 226 (e.g., using input device 216). The content preloading application 222 can then identify the content 224a to preload in the content preloading application 222 based on the input currently entered by the user in the requesting application. For example, if the requesting application 226 indicates to the content preloading application 222 that a user of the requesting application 226 has currently entered "anywhere" in a joint search and address input field (or "omnibox"), the content preloading application 222 may not load any content. If, however, the requesting application 226 indicates to the content preloading application 222 that a user of the requesting application 226 has currently entered "anywhere corpor" in a joint search and address input field (or "omnibox"), the content preloading application 222 may load the web page for Anywhere Corporation in the background.

Figure 3:
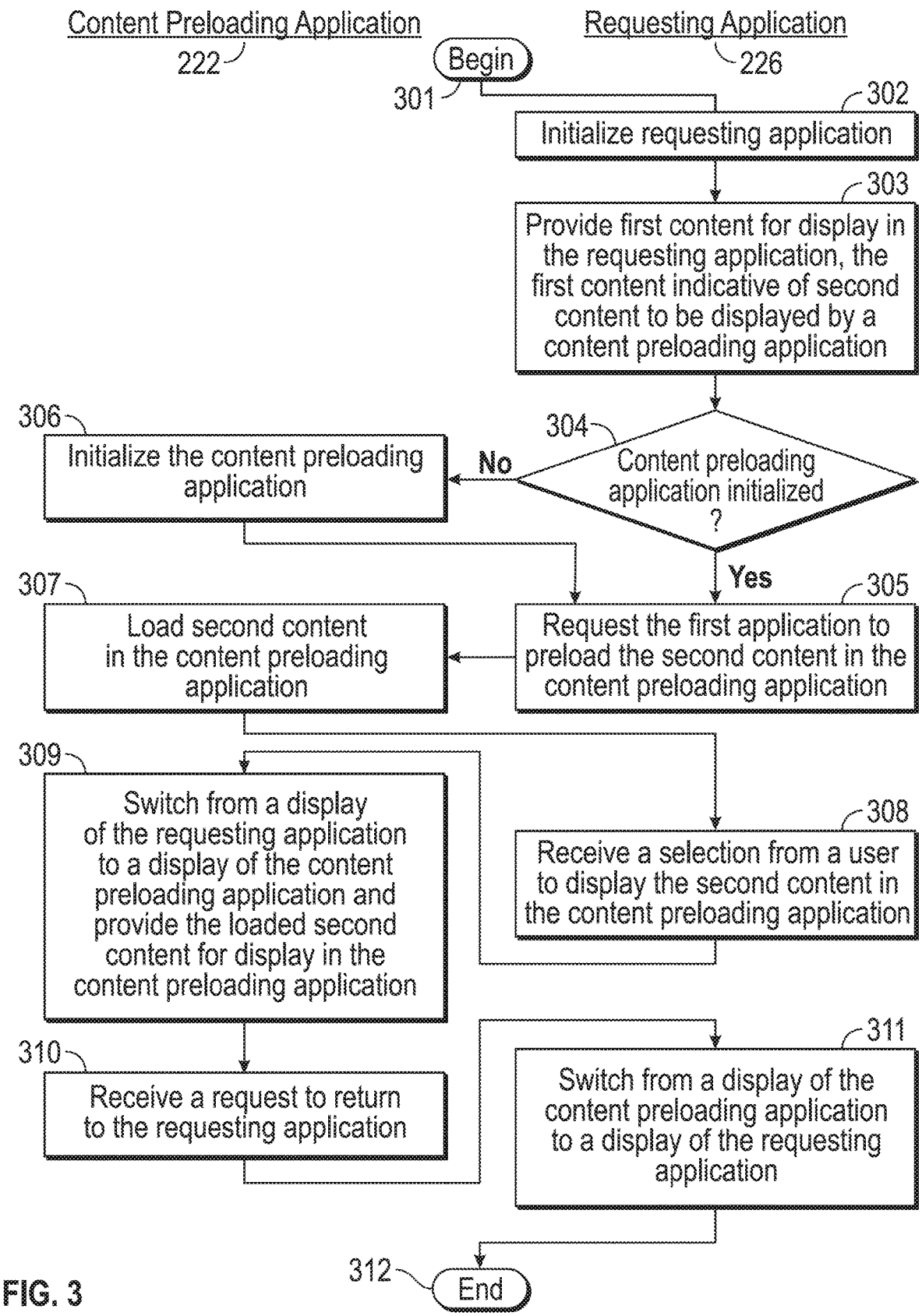
FIG. 3 illustrates an example process for preloading content in one application for another application using an example client of FIG. 2.

FIG. 3 illustrates an example process 300 for preloading content 224a in one application (e.g., the content preloading application 222) for another application (e.g., the requesting application 226) using the example client 110 of FIG. 2. While FIG. 3 is described with reference to FIG. 2, it should be noted that the process steps of FIG. 3 may be performed by other systems.

The process 300 begins by proceeding from beginning step 301 when a user requests to initialize the requesting application 226 to the requesting application 226 where in step 302 the requesting application 226 is initialized. Next, in step 303, the requesting application provides first content for display in the requesting application 226. The first content is indicative of second content (e.g., content 224a) to be displayed by the content preloading application 222. A determination is made in decision step 304 whether the content preloading application 222 is initialized.

If the determination of decision step 304 indicates the content preloading application 222 is not initialized, the process 300 turns to the content preloading application 222 where in step 306 in which the content preloading application 222 is initialized, and then the process 300 proceeds to step 305. Otherwise, if the determination of decision step 304 indicates the content preloading application 222 is initialized, the process 300 proceeds to step 305 in which the requesting application 226 requests the content preloading application 222 to preload the second content (e.g., content 224a) in the content preloading application 222. The process 300 then proceeds from step 305 to step 307 in which the second content (e.g., content 224a) is loaded (e.g., as a client copy, content 224b) in the content preloading application 222.

Returning to the requesting application 226, next in step 308 the requesting application receives a selection from a user to display the second content (e.g., content 224a) in the content preloading application 222.

Turning back to the content preloading application 222, in step 309 the display of the requesting application 226 (i.e., in step 308) is switched (e.g., on the output device 214 of the client 110) to a display of the content preloading application 222, and the loaded second content (e.g., content 224b) is provided for display in the content preloading application 222. Next, in step 310, a request is received (e.g., in the content preloading application 222) to return to the requesting application 226.

The process 300 then returns to the requesting application 226 where in step 311, the display of the content preloading application 222 (i.e., in step 310) is switched (e.g., on the output device 214 of the client 110) back to the display of the requesting application 226. The process 300 then ends in step 312.

FIG. 3 set forth an example process 300 for preloading content 224a in one application (e.g., the content preloading application 222) for another application (e.g., the requesting application 226) using the example client 110 of FIG. 2. An example will now be described using the example process 300 of FIG. 3, a requesting application 226 that is an email communication application, first content that is an email message, a content preloading application 222 that is a web browser, second content that is a web page, and a client 110 that is a mobile device having a touch display for its input device 216 and output device 214.

Figure 4A:
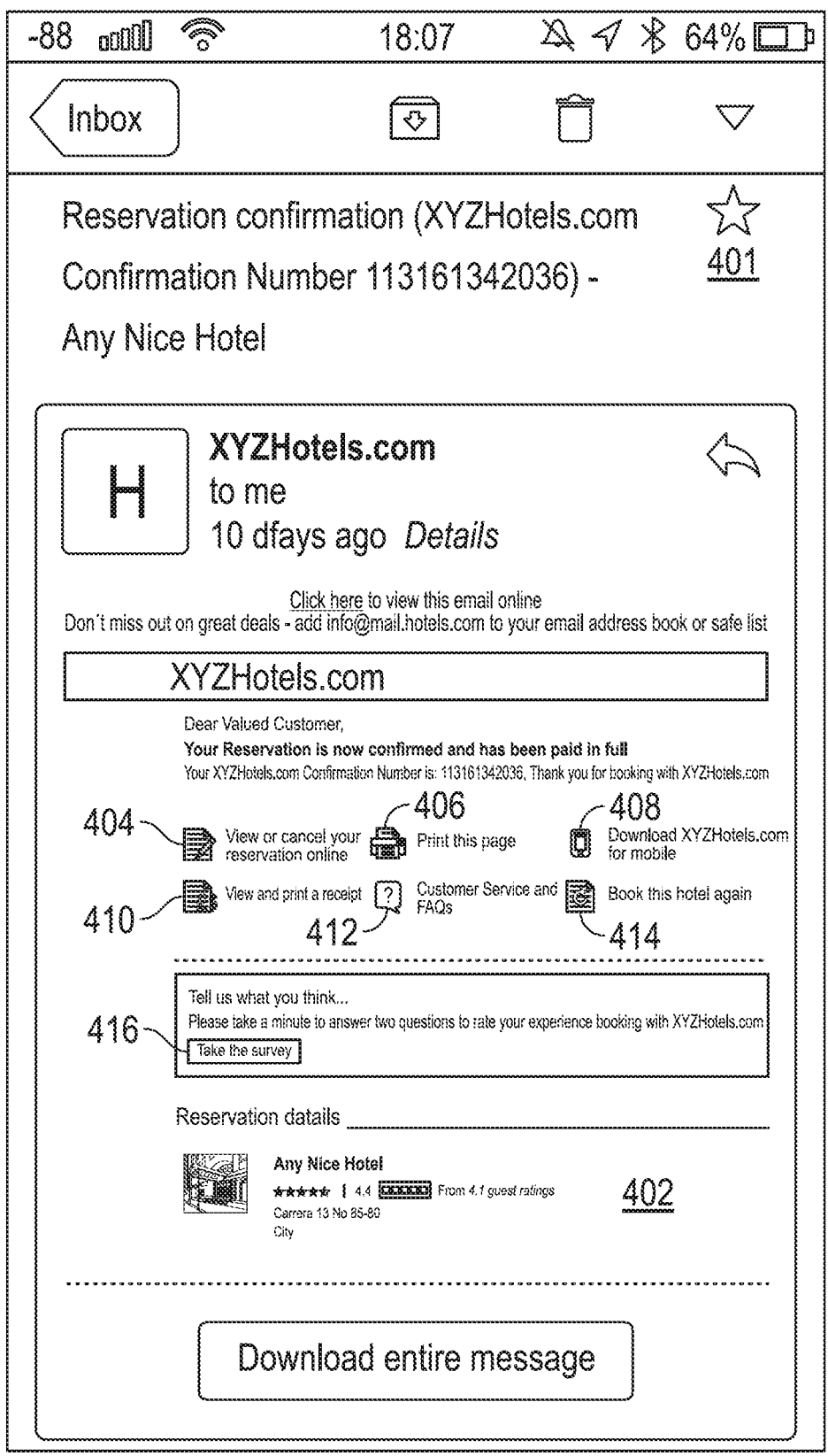
FIGS. 4A and 4B are example illustrations associated with the example process of FIG. 3.

The process 300 begins by proceeding from beginning step 301 when a user requests to initialize the email communication application 226, to the email communication application 226 where in step 302 the email communication application 226 is initialized. Next, in step 303, the email communication application provides an email message for display in the email communication application 226. FIG. 4A provides an example illustration 400 of the email communication application 226 displaying an email message 401. The email message 401 includes various links 402, 404, 406, 408, 410, 412, 414, and 416 to web pages configured to be displayed by the web browser application 222.

The process 300 then proceeds to decision step 304 in which a determination is made whether the web browser application 222 is initialized. The determination of decision step 304 indicates the web browser application 222 is not initialized, and the process 300 turns to the web browser application 222 where in step 306 the web browser application 222, is initialized. Returning to the email communication application 226, in step 305 the email communication application. 226 requests the web browser application 222 to preload in the web browser application 222 a particular link 402 to a web page 224b due to a determination that the particular link 402 is the most likely link among the various links 402, 404, 406, 408, 410, 412, 414, and 416 to be selected by the user. Next, in step 307, the web page 224a linked to by the particular link 402 identified in the request from the email communication application 226 is downloaded in the web browser application 222 and stored in memory 220 of the mobile device 110 as a client copy of the web page 224b.

Figure 4B:
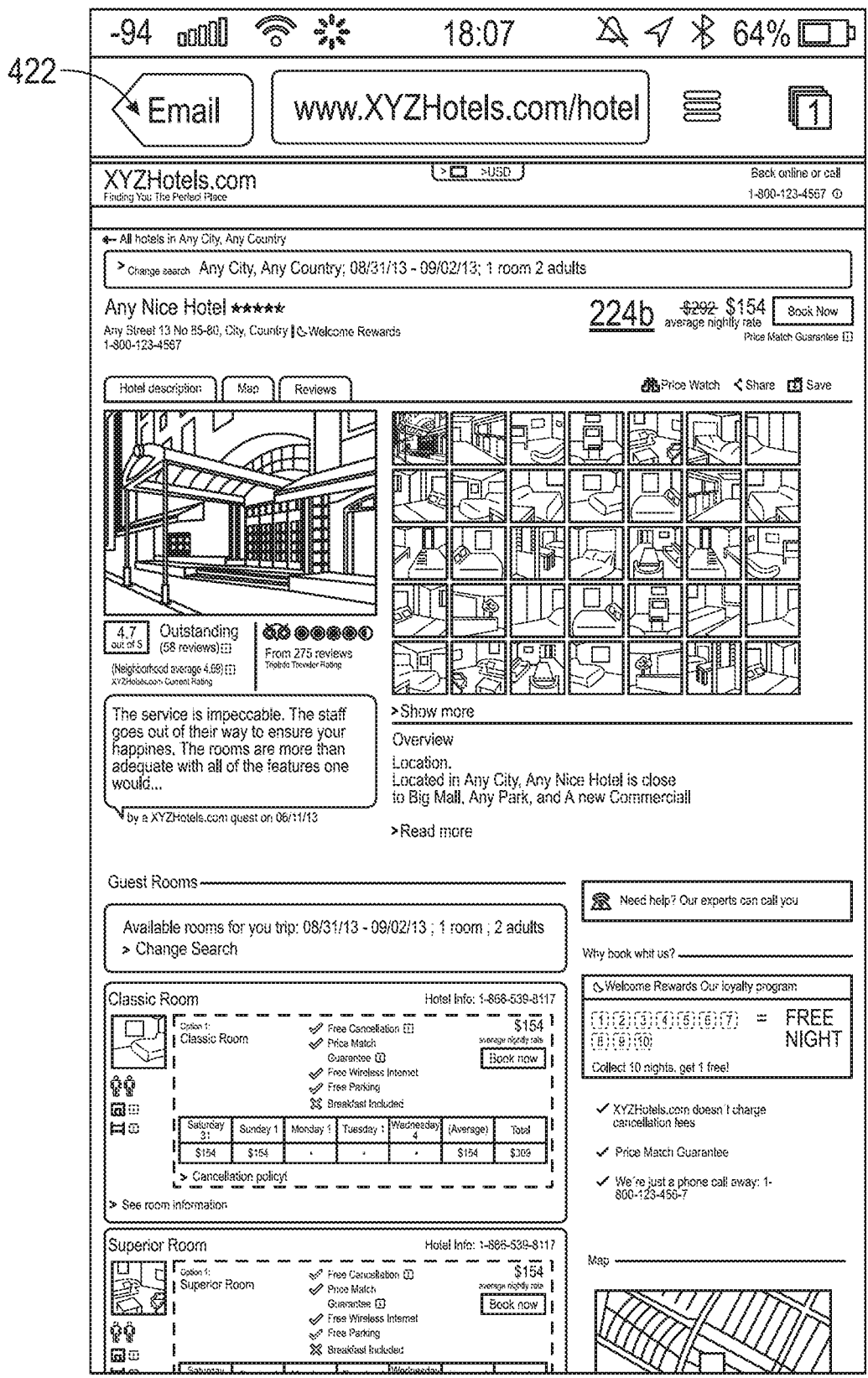

Returning to the email communication application 226, in step 308 the email communication application receives a selection from a user (e.g., using the touch display 214) for the particular link 402. Turning back to the web browser application 222, in step 309 the display of the email communication application 226 (i.e., in step 308) is switched (e.g., on the touch display 214 of the mobile device 110) to a display of the web browser application 222, and the loaded web page 224b is provided for display (e.g., substantially immediately due to having been preloaded in the background) in the web browser application 222 as provided in the example illustration 420 of FIG. 4B. Also displayed in the web browser application 222 is a button 422 for returning to the email communication application 226. Next, in step 310, the user selects the button 422 for returning to the email communication application 226 (e.g., using the touch display 214).

The process 300 then returns to the email communication application 226 where in step 311, the display of the web browser application 222 (i.e., in step 310) is switched (e.g., on the touch display 214 of the mobile device 110) back to the display of the email communication application 226. The process 300 then ends in step 312.

Figure 5:
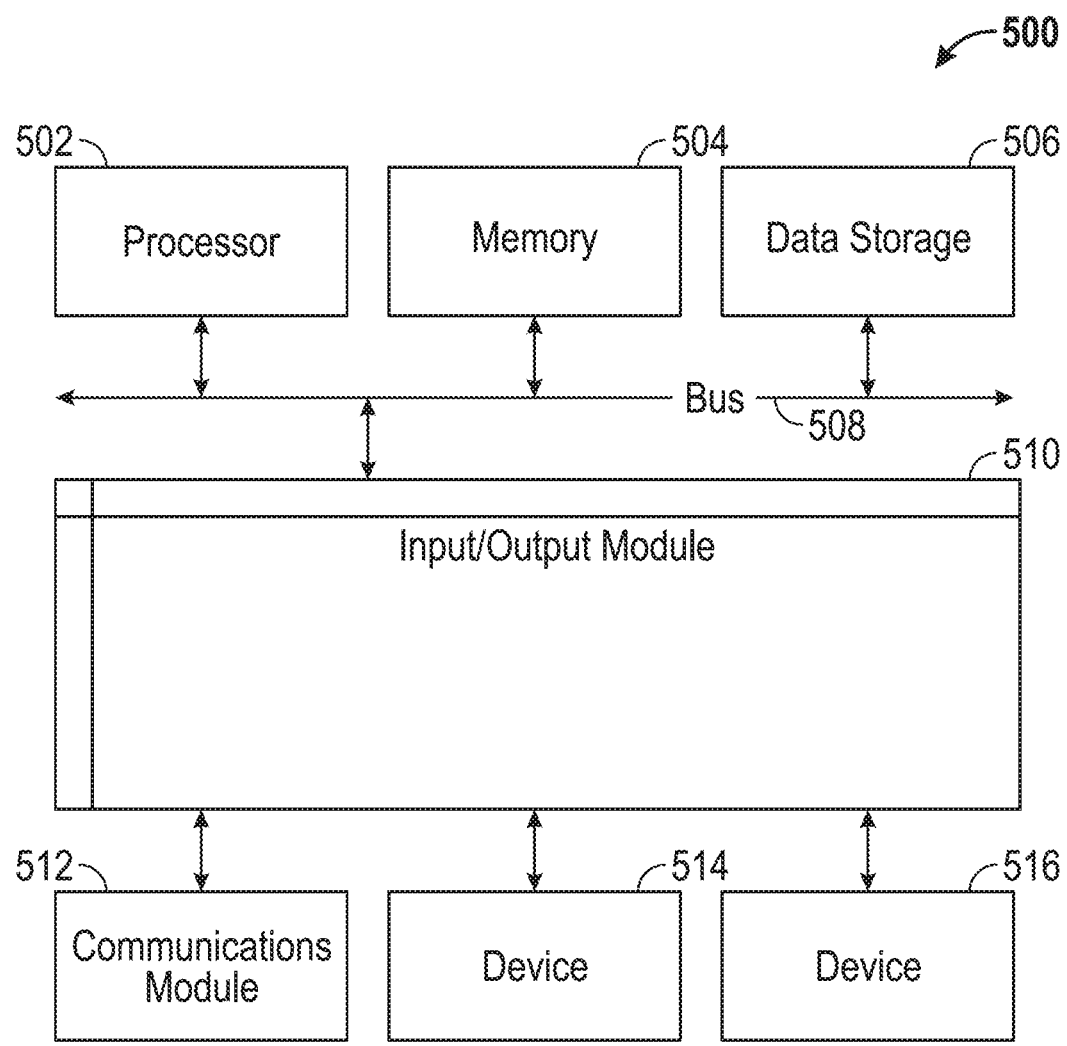
FIG. 5 is a block diagram illustrating an example computer system with which the client and server of FIG. 2 can be implemented.

FIG. 5 is a block diagram illustrating an example computer system 500 with which the client 110 and server of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method comprising:
receiving, by an online content viewing application from a requesting application, an indication of first content being displayed by the requesting application in a foreground of a user interface, wherein the online content viewing application and the requesting application are each software applications stored at a client device, and wherein the online content viewing application and the requesting application are distinct applications;
responsive to receiving the indication of the first content, determining, by the online content viewing application and based on the indication of the first content, second content to be loaded by the online content viewing application;
loading, from an online source by the online content viewing application in a background of the user interface, the second content;
receiving, by the online content viewing application from the requesting application and after the second content is loaded by the online content viewing application, an indication of a user selection associated with the first content being displayed by the requesting application, the user selecting being a request to display the second content; and
responsive to receiving the indication of the user selection, displaying, by the online content viewing application, the second content in the foreground of the user interface.

2. The method of claim 1, further comprising:
responsive to the first content being displayed by the requesting application, initializing the online content viewing application as a background process; and
responsive to receiving the indication of the user selection, switching the online content viewing application to a foreground.

3. The method of claim 1, wherein determining the second content comprises:
determining the second content based on the first content and historical user browsing information associated with online content viewing application.

4. The method of claim 3, wherein the first content comprises a listing of items of a first subject matter, and wherein determining the second content comprises:
identifying, in the historical user browsing information, previously searched items associated with the first subject matter;
identifying a second subject matter of the previously searched items; and
identifying, in the listing of items, an item of the second subject matter,
wherein the second content is loaded based on the item of the second subject matter.

5. The method of claim 1, wherein the requesting application is an email communication application and the first content is an email message comprising one or more links to online content, wherein determining the second content to be loaded comprises determining, based on the one or more links to the online content, a link to the online source, wherein the determined second content is loaded by the online content viewing application using the link to the online source.

6. The method of claim 1, further comprising:
after loading the second content and before displaying the second content in the foreground of the user interface, receiving, by the online content viewing application, an indication that new content is to be loaded instead of the second content; and
loading, by the online content viewing application, the new content as the second content before displaying the second content in the foreground of the user interface.

7. The method of claim 6,
wherein the user selection is for the new content, and
wherein the indication that the new content is to be loaded instead of the second content is received in connection with the indication of the user selection associated with the first content being displayed by the requesting application.

8. The method of claim 1, wherein the online content viewing application is a web browser.

9. The method of claim 8,
wherein first content being displayed by the requesting application comprises one or more links to online content,
wherein the second content to be loaded by the online content viewing application is determined, by the online content viewing application, based on selecting a selected link from the one or more links, and
wherein the second content is loaded from the online source based on the selected link.

10. The method of claim 9, wherein the selected link is selected based on a probability value that the selected link will be selected by a user using the requesting application.

11. A system, comprising:
a display that displays a user interface;
one or more processors; and
a memory that stores instructions for an online content viewing application and a requesting application, wherein the online content viewing application and the requesting application are distinct applications, and wherein the instructions for the online content view application, when executed by the one or more processors, cause the one or more processors to:
receive, from the requesting application, an indication of first content being output, by the requesting application, for display in a foreground of the user interface;
responsive to receiving the indication of the first content, determine, based on the indication of the first content, second content to be loaded by the online content viewing application;
load, from an online source and in a background of the user interface, the second content;
receive, from the requesting application after the second content is loaded, an indication of a user selection associated with the first content being output by the requesting application, the user selecting being a request to display the second content; and
responsive to receiving the indication of the user selection, output, for display in the foreground of the user interface, the second.

12. The system of claim 11, wherein the memory further stores instructions that, when executed by the one or more processors, cause the one or more processors to:
responsive to the first content being output by the requesting application, initialize the online content viewing application as a background process; and responsive to receiving the indication of the user selection, switch the online content viewing application to a foreground process.

13. The system of claim 11, wherein the second content is determined based on the first content and historical user browsing information associated with online content viewing application.

14. The system of claim 13, wherein the first content comprises a listing of items of a first subject matter, and wherein the instructions for online content viewing application that cause the one or more processors to determine the second content comprise instructions that cause the one or more processors to:
- identify, in the historical user browsing information, previously searched items associated with the first subject matter;
- identify a second subject matter of the previously searched items; and
- identify, in the listing of items, an item of the second subject matter,
- wherein the second content is loaded based on the item of the second subject matter.

15. The system of claim 11, wherein the requesting application is an email communication application and the first content is an email message comprising one or more links to online content, and wherein the instructions for online content viewing application that cause the one or more processors to determine the second content comprise instructions that cause the one or more processors to:
- determine a link to the online source from the one or more links to online content,
- wherein the instructions for the online content viewing application cause the one or more processors to load the second content using the link to the online source.

16. The system of claim 11, wherein the instructions for the online view application, when executed, further cause the one or more processors to:
- after loading the second content and before outputting the second content for display in the foreground of the user interface, receive an indication that new content is to be loaded instead of the second content; and
- load the new content as the second content before the second content is displayed in the foreground of the user interface.

17. The system of claim 16, wherein the user selection is for the new content, and wherein the indication at the new content is to be loaded instead of the second content is received in connection with the indication of the user selection associated with the first content being displayed by the requesting application.

18. The system of claim 11, wherein the online content viewing application is a web browser.

19. The system of claim 18,
- wherein first content being displayed by the requesting application comprises one or more links to online content,
- wherein the second content to be loaded by the online content viewing application is determined based on selecting a selected link from the one or more links, and
- wherein the second content is loaded from the online source based on the selected link.

20. A non-transitory machine-readable storage medium comprising machine-readable instructions stored thereon that, when executed, cause one or more processors of a computing device to:
- responsive to first content being output, by a requesting application, for display in a foreground of a user interface being displayed by a display device of the computing device, initialize an online content viewing application as a background process, wherein the online content viewing application and the requesting application are distinct applications;
- after initializing the online content viewing application, receive, from the requesting application, an indication of one or more links to online content included in the first content being displayed;
- select, using the online content viewing application and based on the indication of the one or more links, a link from the one or more links;
- responsive to receiving the indication of the one or more links, determine, using the online content viewing application and based on the link, second content to be loaded;
- load, from an online source and while the online content viewing application is executing as the background process, the second content;
- receive, from the requesting application after loading the second content, an indication of a user selection of the link; and
- responsive to receiving the indication of the user selection of the link, output, by the online content viewing application and for display, the second content in the foreground of the user interface.

* * * * *